United States Patent

[11] 3,609,648

| [72] | Inventors | Joseph M. Sebas<br>Stratford;<br>Charles F. DeMey, II, West Redding, both of Conn. |
|---|---|---|
| [21] | Appl. No. | 38,354 |
| [22] | Filed | May 18, 1970 |
| [45] | Patented | Sept. 28, 1971 |
| [73] | Assignee | The Perkin-Elmer Corporation<br>Norwalk, Conn. |

[54] SYSTEMS FOR CONTROLLING A PLURALITY OF VARIABLE FUNCTIONS OF AN INSTRUMENT
8 Claims, 7 Drawing Figs.

[52] U.S. Cl. ............................................................ 338/128, 74/10.8
[51] Int. Cl. ............................................................ H01c 5/02, H01c 9/02
[50] Field of Search .............................................. 74/10.8, 213; 334/15; 338/128–132

[56] References Cited
UNITED STATES PATENTS

| 1,783,542 | 12/1930 | Merle .............................. | 338/131 |
| 3,101,628 | 8/1963 | Shelley ........................... | 338/131 X |

Primary Examiner—Lewis H. Myers
Assistant Examiner—Gerald P. Tolin
Attorney—Edward R. Hyde, Jr.

ABSTRACT: In an instrument (e.g., a spectrophotometer) having various operating parameters or functions, various groupings of a particular value for each of these functions (e.g., scan time, slit program, amplifier gain, and scan suppression) can be "set" or "stored," for example on different potentiometers, for "recall" or use. Each "set" or "stored" condition of each function may be "reset" separately, and a particular grouping (e.g., four) of these new individual function values can then be "recovered" for use together by merely "addressing" or "choosing" a particular (mode) grouping.

PATENTED SEP 28 1971
3,609,648
SHEET 1 OF 4
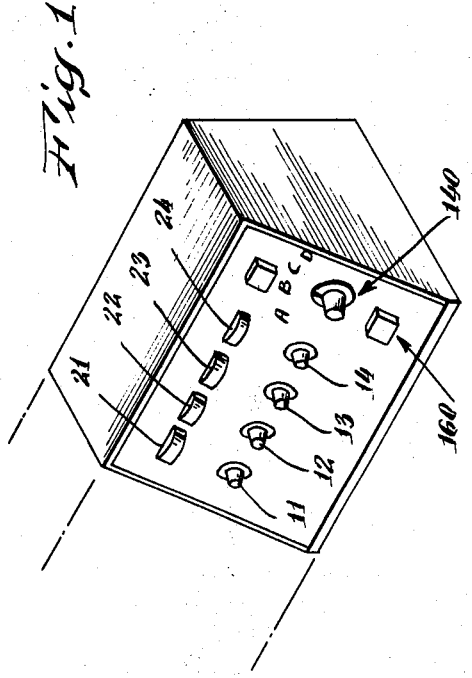
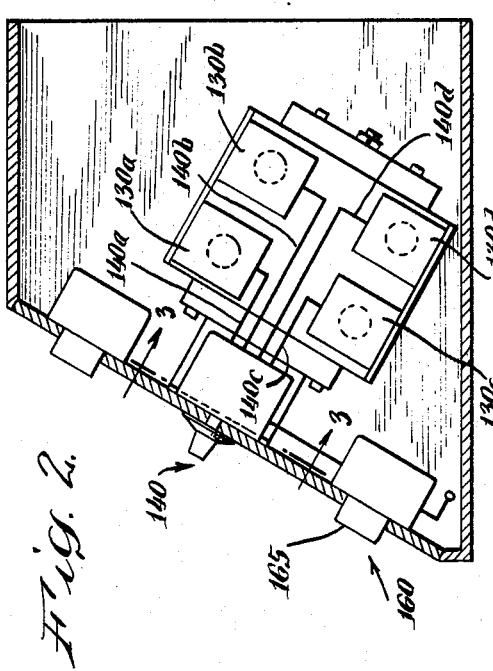
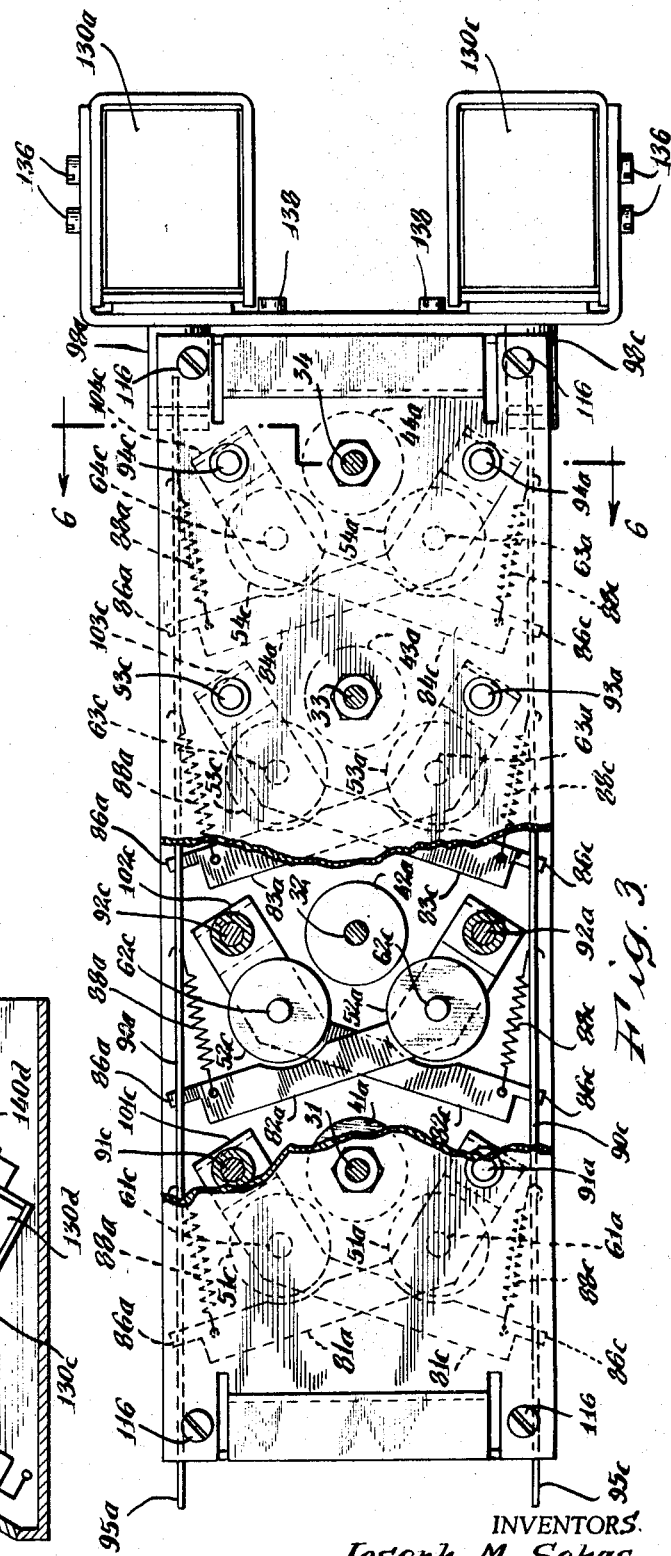
INVENTORS.
Joseph M. Schas
BY Charles F. deMey II
Daniel R. Levinson
ATTORNEY.

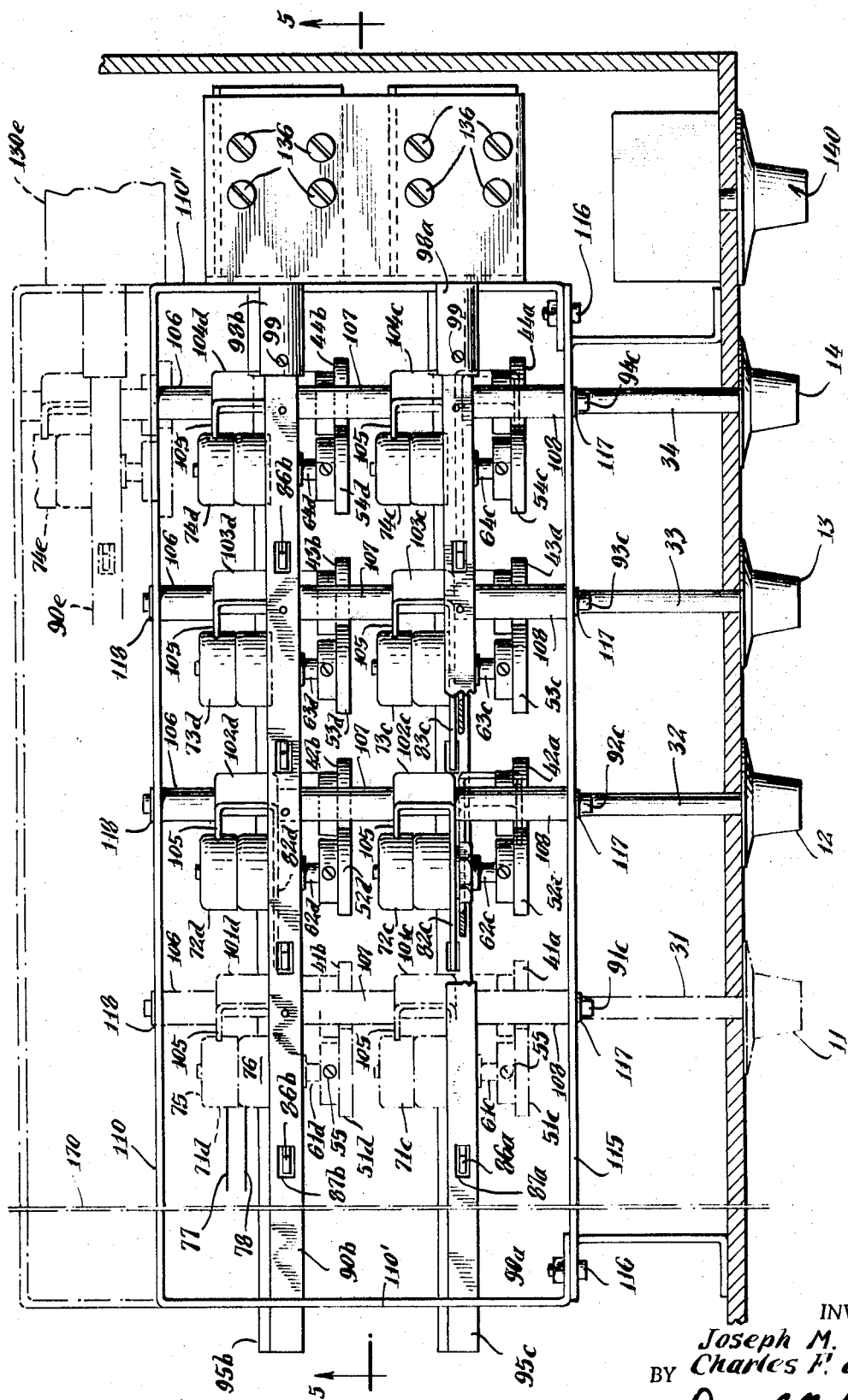

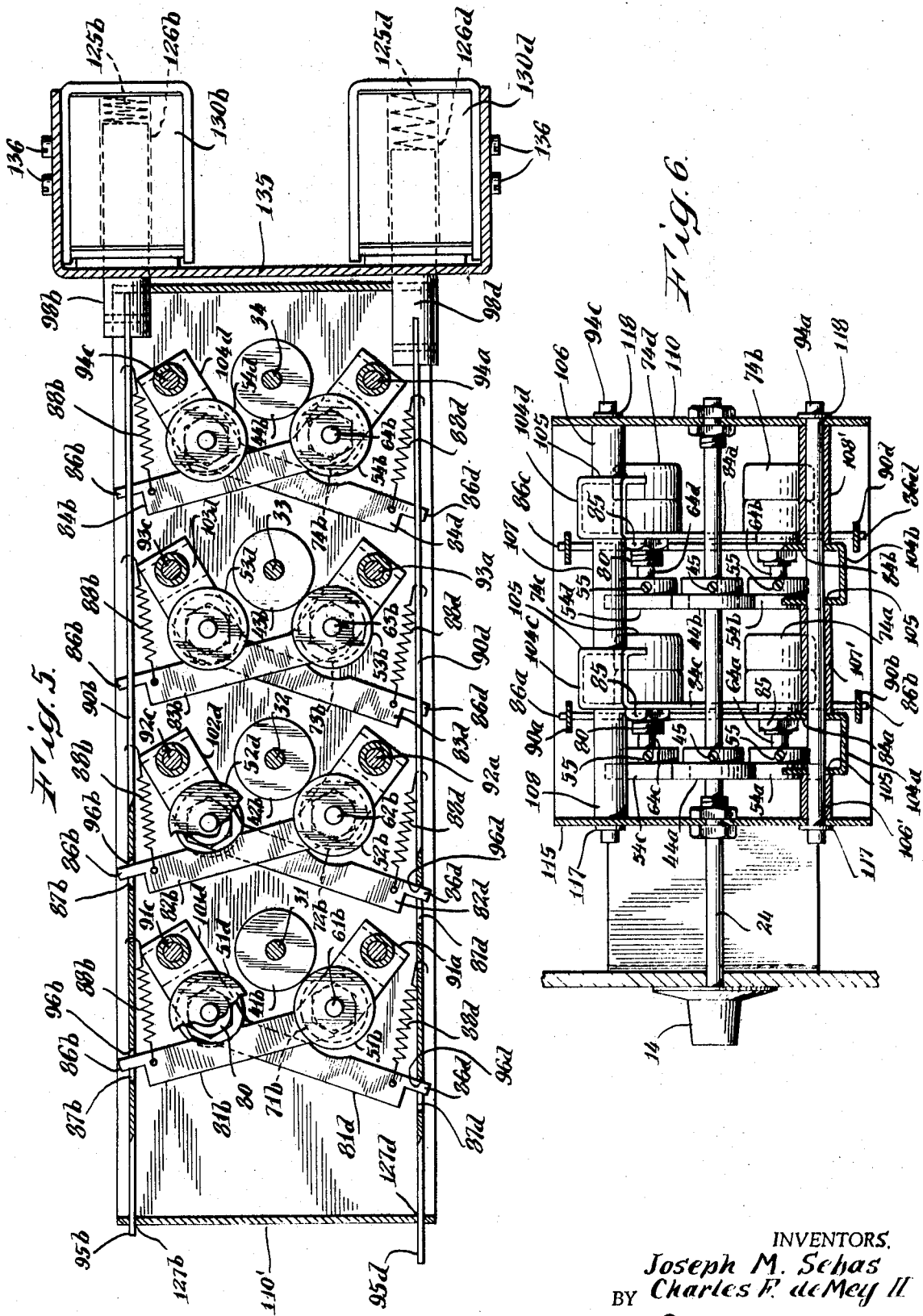

SYSTEMS FOR CONTROLLING A PLURALITY OF VARIABLE FUNCTIONS OF AN INSTRUMENT

GENERAL DESCRIPTION

This invention relates to instrument controls. More particularly the invention concerns the control of an instrument, for example, a spectrophotometer, in which the various operating parameters or functions have normally manually controllable elements varying these functions, in which the invention control system allows each of a plurality of such function-controlling elements to be adjusted to a particular desired value and then by a single manual operation allows simultaneous recovery or use of this set of particular values for the various functions. Further the invention preferably embodies a plurality of series of settable elements for each of the different functions, so that the operator may choose to have the instrument controlled by any one particular group of one each of such different elements, thereby obtaining a choice of a plurality of different preset values for each of the various functions.

For the purposes of making the explanation easier to follow a specific concrete example of how the invention may be utilized in a particular instrument, namely, a spectrophotometer, will be given. However, it will be apparent that the single embodiment hereinafter more fully described and illustrated is merely exemplary in nature, and that the particular functions or parameters referred to in describing this specific embodiment are merely utilized in order to make the description more concrete and therefore easier to follow. Thus, although the particular functions, the exact number thereof, and the exact number of combinations or groups of these functions are given specified in the exemplary embodiment, merely for purposes of simplifying the explanation of how such an exemplary embodiment operates, they are not intended in any way to imply limitation to a specific use or a specific number of any part of the inventors control system.

In the ensuing description of such exemplary embodiment, as used to control, for example, a spectrophotometer, the exemplary four functions involved in the control system will be assumed to be the amplifier gain (of one or more stages of the amplifying circuits to which the output of the radiation detector is connected), the "scan" speed or time (at which a dispersive element is effectively rotated and the corresponding, say, abscissa drive of the typically chart-type recorder is run), a scan suppression function (wherein the scan is slowed down whenever the measured value, i.e., the ordinate recorder value, giving the transmission or absorbance of a sample material is changing rapidly so as to avoid loss of detail in the recorded values on typically a paper chart having, say, wave numbers as its abscissa and either percentage transmission or absorbance units as its ordinate values), and finally a slit-program control (for varying the entrance and exit slit widths, as by multiplier, such slits being assumed to be varied or programmed in accordance with the wave number, or wavelength, scanning already in a well-known manner). In versatile conventional spectrophotometers any one or more of these four functions may be manually variable, as by an individual potentiometer connected to a manually rotatable knob, so that the operator may choose an appropriate value of detector amplifier again, abscissa scanning speed, degree of abscissa speed suppression, and range of slit width values which are appropriate for the sample and type of analysis being utilized.

Where all such, say, four functions are individually manually settable, the operator may be required to reset each of these, say, four different function values when he wishes to utilize the instrument effectively for an entirely different type of sample and/or type of analysis. The exemplary control system according to the invention eliminates the need for resetting of each of these, say, four individual function values, at least when the operator wishes to run analysis using a particular set or grouping of four function values that he has utilized in the past. In particular, the inventive control system allows the operator to "recall" a particular set of function values whenever the same type of analysis is desired to be performed by merely selecting a single group or mode of the, say, four different function values. In addition, the exemplary control system allows complete versatility in the operator's ability to reset any one or more (including all four) of the values of the different functions in any one or more of the groups or modes (hereinafter referred to as A, B, C and D). Thus in the illustrated exemplary embodiment the operator may preset and then select any one of four groups of the four different function values, by merely selecting "mode A," "mode B," etc.

In somewhat more specific terms, the exemplary embodiment of the invention includes a series of similar elements (say, potentiometers) for each of the different functions (e.g., amplifier gain, scan time, etc.), each one of the series of elements being settable to a particular value, as by being temporarily engaged by a manually actuated setting mechanism (for example, a shaft having a wheel capable of engaging any-one of the individual wheels on each of the potentiometer shafts), means for connecting temporarily one particular one of a series of each of the function-controlling elements to one of the manual setting means, each of the elements in each series corresponding to a control element in each of the other series (controlling the different functions), and means for simultaneously connecting such a corresponding one of each of the different elements in the different function series (e.g., group A, group B, etc.) to control its respective function.

In this manner the operator may set say the "A" element in each of the different function series (e.g., amplifier gain, scan time, etc.) to an appropriate value for a particular type of analysis; at the same or a different time set each of the, say, "B" corresponding elements in each of these indicating series to another set of values, and so on; and then by manipulating a single knob connect all of the "A" elements into the circuits controlling their respective functions, thus setting the entire spectrophotometer "program" to comprising desired set of function values or parameters in an easily repeatable manner. In the exemplary embodiment four different functions (amplifier gain, scan time, scan suppression and slit program) are assumed to be controlled, and a series of four different elements are provided for each of these functions (each corresponding element of the series being hereafter usually referred to as the A element, the B element, the C functions and the D element), so that the exemplary control system may provide four groups of four, generally different, discrete values for each of the functions. The operator may thereby set all four functions or parameters to a particular set of values merely by moving a single mode selector switch to the "A" mode position. In addition since each of the four manual selecting means (e.g., knobs, shafts and wheels) may be connected to anyone of the different ones (say, the A, B, C and D elements) of its respective one of the four function-controlling elements, the operator may change at any time the particular values of the parameter one or more of the four different functions that will be set by setting the mode selector to, say, "A." Thus, a control system according to the invention, as hereinafter more fully described relative to an exemplary embodiment, provides the operator a choice of, say, four (A, B, C and D) groups of particular function values by means of a single setting of the mode selector; while on the other hand allows complete versatility in resetting each of the 16 different control elements (namely, a series of four similar elements that may be connected into any one of the, say, four different function circuits) by means of four manual setting knobs.

Accordingly, an object of the invention is the provision of a convenient control system for a plurality of functions, which allows simultaneous selection of the values for a plurality of different functions while still providing complete versatility in the ability to preset any and all of these individual function movement or elements.

Other similar and more specified objects of the invention will become obvious to one skilled in the art upon reading the following detailed description of a single exemplary embodiment, in conjunction with the accompanying drawings, in which:

FIG. 1 is a perspective, somewhat simplified, view of the manually operable setting knobs, the single group or mode selection knob, and the setting or resetting pushbutton, which comprise the manually actuated parts of an exemplary control system according to the invention;

FIG. 2 is a vertical section taken just inside the end cover (at the right in FIG. 1) and looking generally in the direction of from right to left in FIG. 1, showing the general layout of the various elements of the exemplary control system according to the invention;

FIG. 3 is a section taken on the lines 3—3 in FIG. 2, showing the four manually settable shafts and the front pair of the (four) function-controlling elements associated with each of these shafts;

FIG. 4 is a plan view of the entire device;

FIG. 5 is a generally vertical section taken on the lines 5—5 of FIG. 4 showing the rear pair of the control elements and their associated manual setting shafts and wheels;

FIG. 6 is a vertical section taken on the lines 6—6 in FIG. 3; and

Figure 7:
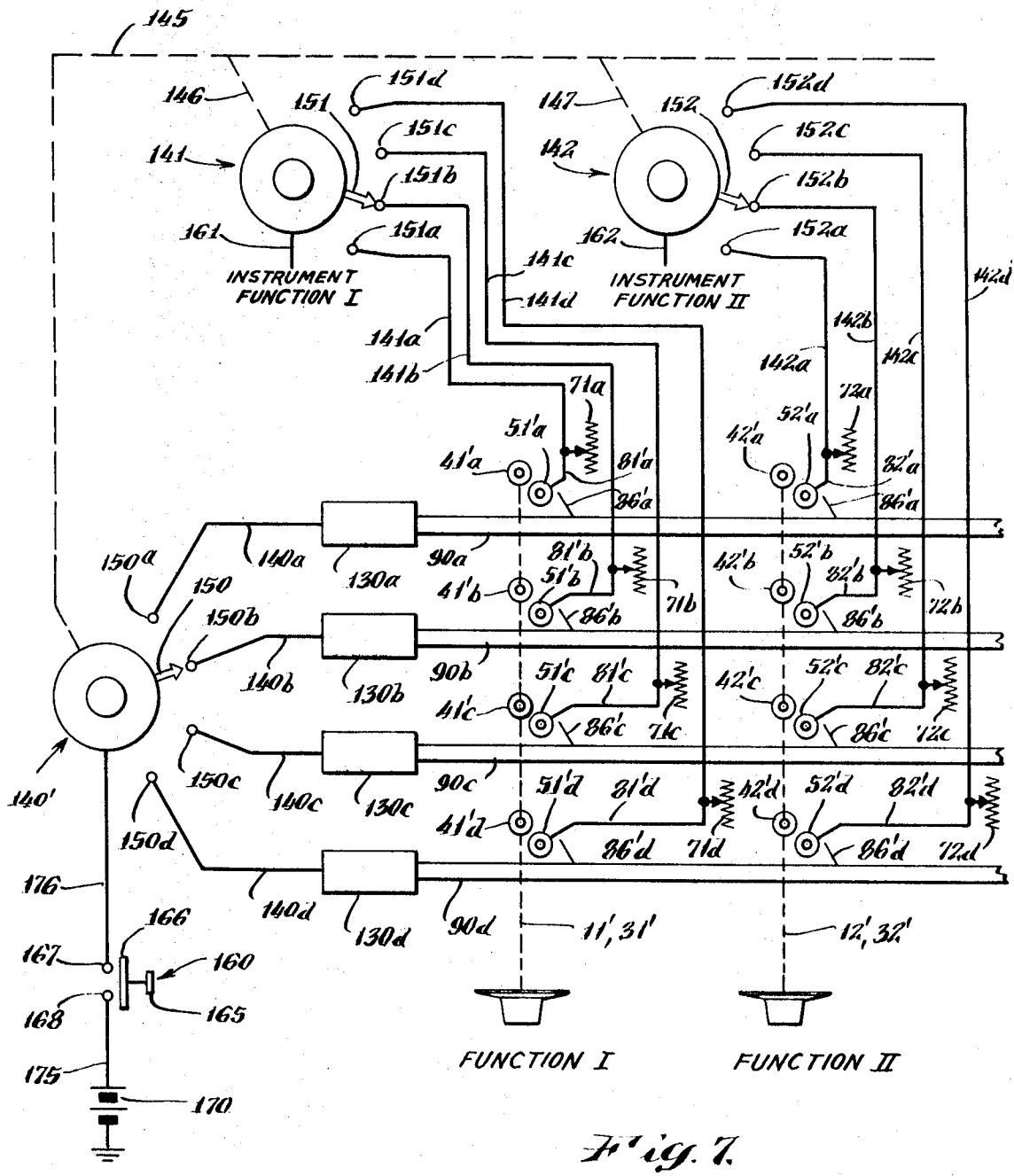

FIG. 7 is a schematic representation of the means for setting each of the individual control elements in a series to a desired value, and for connecting a desired corresponding one (e.g., Group A) of each element in a series to control the respective instrument function with the desired value set on the chosen element, all four elements in a series being shown, but only two of the (four) functions and therefore only two (of the four) series of elements being shown.

SPECIFIC DESCRIPTION OF EXEMPLARY EMBODIMENT

As may best be seen in FIG. 1, each of the four functions (e.g. amplifier gain, scan time, scan suppression, and slit width adjustment) has associated therewith a manually operable element, namely, a rotatable knob 11, 12, 13 and 14 respectively. Each of these knobs is thus associated and may be connected, in a manner described hereinafter, with (any one of) the elements controlling a different function. Thus, knob 11 may control, for example, the amplifier gain, knob 12 the scan time (or speed), etc. It will be seen that each knob and its associated function, for example, element 11, may operate any one of a series of similar elements (four in the illustrated embodiment), any one of which may be set to a specific value and then (or subsequent) utilized to control that particular function. For example, knob 11 may be utilized to set any one of a series of four potentiometers to a particular value, and any one of these potentiometers may then be utilized in the detector-amplifying circuits to control the gain of this circuit. In a similar manner each of the other knobs may set any one of a series (e.g., four) of a different set of similar elements (all potentiometers in the exemplary embodiment) to allow adjustment of each of these similar elements in a given series so as to provide four easily retrievable values that may be utilized to control that particular function (e.g., scanning time, slit width etc.).

In order to facilitate understanding of both the functional and structural relationships between the elements, as well as to eliminate redundancy in description of the elements in the drawings, all elements associated with the first function (e.g., amplifying gain) are referenced so that their last number is a "1" (e.g., knob 11). Similarly all the elements associated with the second distinct function (say, scan speed) are reference with numerals ending in "2" (see knob 12), all elements associated with the third function have reference numerals ending in "3" and all elements associated with the fourth function e.g., knobs 14) are labeled with a number ending in "4." Thus immediately above knobs 11–14 are meters or other indicators 21–24, which give a visual indication of the state of the particular function being controlled.

As may best be seen in FIG. 4, each of the knobs 11–14 is rigidly connected to its own respective shaft 31, 32, 33 and 34. Each of these long shafts has rigidly attached a front drive wheel 41a, 42a, 43a, and 44a respectively (see FIGS. 3 and 4) and a similar rear driving wheel 41 and 44b respectively (see FIGS. 4 and 5). As may best be seen in FIG. 6 from drive wheels 44a and 44b, each of the drive wheels are rigidly attached to their respective shafts (31–34) as by means of screws 45. Each of the drive wheels, both in the front (namely 41a–44ab–44b ) is operatively associated with a pair of driven wheels. For example in FIG. 6, there is lower driven wheel 54a and an upper driven wheel 54c associated with front driving wheel 44a and similarly rear driving wheel 44b has associated therewith a lower driven wheel 54b and an upper driven wheel 54d. Thus in the plan view of FIG. 4, only the respective upper front driven wheels 51c–54c and the upper rear driven wheels 51d–54d are visible. However in FIG. 3 the upper and lower driven wheels 51c–54c and 51a–54a, associated with the front driving wheels 41a–44a are seen; while in FIG. 5 the upper and lower driven wheels 51d–54d and 51b–54b associated with the rear driving wheels 41b–44b are visible.

Each of the driven wheels or rollers 51a –54a, 51b–54b, 51c–54 and 51d–54d are rigidly attached to a different potentiometer shaft, namely, front lower potentiometer shaft 61a–64a (see FIG. 3), lower rear potentiometer shaft 61b–64b (see FIG. 5) and corresponding upper front shaft 51c–54c (FIGS. 4 and 5) and rear upper shafts 61d–64d (FIGs. 4 and 5). Since each of the driven wheels or rollers (51a–54a, 51b–54, etc.) is rigidly connected to its respective potentiometer shaft (61a–64a, 61b–64b, etc.) as by setscrews 55, rotation of any one of such wheels or rollers will cause rotation of its respective adjusting potentiometer shaft and therefore of the potentiometers driven thereby. In particular each of the 16 potentiometer adjusting shafts acts to simultaneously adjust a pair of preferably identical ganged potentiometers, each pair of such ganged potentiometers being identified by a single reference character, namely, 71a, 72a, 73a and 74a; 71b, 72b, 73b and 74b; 71c, 72c, etc.; and 71d, 72d, etc. One of each of these pairs of ganged potentiometers may be utilized to control a function (e.g., one of each pair of potentiometers 71a, 71b, 71c, and 71d may act as amplifier-gain-controlling elements) while the other potentiometer of each pair may be utilized to provide a readout of the position of the potentiometer shaft and therefore of the function-controlling member of the pair, as be being connected to the corresponding meter 21–24 (see FIG. 1). Thus one of the potentiometers in each pair may be considered the actual function-controlling element, while the other may merely be utilized to indicate the setting of its paired function-controlling potentiometer. Although this will be assumed to be the case in the illustrated exemplary embodiment, it is deemed obvious that each of the potentiometers in a given pair may be utilized as function-controlling elements, for example, when it is desirable to simultaneously control in an identical manner two similar or identical instruments or systems. In order to avoid unnecessary cluttering of the drawing, only the dual or ganged pair of potentiometers 71d in the upper left-hand corner of FIG. 4 are individually referenced as 75, 76 and shown as having independent electrical leads 77 and 78 respectively, it being understood that each of the potentiometers in each pair in fact may be considered separate and will have separate leads. To avoid redundancy in the following explanation, however, each ganged potentiometer pair will often be considered as a single potentiometer since each potentiometer in each pair necessarily follow the other both mechanically and in their electrical characteristics.

Each of the lower potentiometer assemblies, comprising a driver wheel or roller (e.g., 51a), potentiometer shaft (e.g., 61a) and dual potentiometer e.g., 71a) are rigidly mounted to a pivotable lever-shaped bracket 81a, 82a, 83a and 84a (see a particular FIG. 3) for the lower front group, and similar brackets 81b–84b for the lower rear group (see especially FIG.

5). In a similar manner each of the front upper potentiometer assemblies (e.g., elements 51c, 61c, and 71c) are rigidly supported in a depending but otherwise similar pivotable lever-shaped bracket 81c–84c; while each of the upper rear potentiometer assemblies are similarly attached to a pivotal bracket 81d–84d. In particular each of the potentiometer housings are preferably provided with a conventional threaded reduced portion 80 (see especially FIG. 6) passing through an aperture in the respective brackets (81a–84a, 81b–84b etc.), onto which a nut 85 is threadingly engaged so as to cause the various bracket (81a–84a, 81b–84 b, etc.) to be tightly held between the respective potentiometer housings and tightened nuts 85. Each pair of front and rear lower brackets (namely 81a–84a and 81b–84b) are mounted on one of four long pins or axles 91a–94a (see FIG. 3 and 5) which act as a pivot axis located near the bottom of the respective brackets (81a–84a and 81b–84b) and the assemblies carried thereby.

In an analogous manner each aligned pair of each of the front and rear depending brackets 81c–84c and 81d–84d, respectively, are pivotally mounted about one of four similar upper long pins or axles 91c, 92c, 93c and 94c (as may best be seen for the front brackets and supported elements in FIG. 3 and for the rear brackets and supported elements in FIG. 5 and for both front and rear brackets and elements in FIG. 4). As may best be seen from FIG. 4, all of the depending front brackets 81c–84c and depending rear brackets 81d–84d have integrally formed at their upper end a U-shaped or double right-angle bent portion 10d–104d respectively, so as to form a series of relatively small substantially depending tab portions 105 which are generally parallel to but substantially spaced from the main portion of the respective brackets (81c–84c and 81d–84d). As may best be seen from a comparison of the upper parts of FIGS. 3 and 5 with FIG. 4, both the main part of the various upper brackets 81c–84c and 81d–84d and their integrally attached (through portions 101c–104c and 101d–104d, respectively) depending tabs are apertured to receive the upper axle pins 91c–($c, thereby tending to restrain the various depending brackets from motions other than pivotal ones about the axles in planes parallel to the paper in FIGS. 3 and 5.

In order to restrain the brackets from longitudinal movement along the axle pins 91c–94c, a series of spacing sleeves 106, 107, and 108 are preferably provided on each of the axle pins 91c–94c. The axle pins themselves are fixed in space as by being attached to a generally U-shaped main frame 110 and a mechanism plate 115 (in turn attached to the main frame 110 in any conventional manner as indicated at 116), which together form a rigid pair of parallel spaced plates. In particular the axles 91c–94c may be supported in apertures in elements 110, 115, and longitudinally held therein as by grooves formed in the axle pins and engaging circles 117, 118, Thus tubular spacers 106–108, the fixed frame and plate member 110,115 and the fastenings 117,118 of the axle pins 91c–94c restrain the depending brackets 81c–84c and 81d–84d ( and the various elements supported thereby) to pivotal motions parallel to the plane of the paper in FIGS. 3 and 5. In particular this allows engagement of the various driven rollers 51c–54c and 51d–54d with the respective front and rear driving wheel or roller 41a–44a and 41b–44b (see FIG. 4), while assuring alignment of the driving wheels and their respective driven rollers. Reference is made to FIG. 6 for further showing of the manner in which the particular upper brackets 84c and 84d, their right-angle upper ends 104c and 104d respectively and their depending tabs 105 are securely positioned by elements 106–118 against all movements except pivotable, in a direction perpendicular to the plane of the paper in FIG. 6.

Since, as may best be seen from FIG. 6, the lower (front and rear) brackets 81a–84a and 81b–84b may be exactly identical (except for their orientation in space) to the depending upper brackets 81c–84c and 81d –84d, description of the manner in which they are mounted for pivotal motion about the four lower axle pins 91a–94a would be completely repetitious, except that all of the directions would be reversed as far as orientation in space is concerned. Thus since the lower brackets are oriented in the opposite manner, their portions 101a–104a and 101b–104b will be oriented in space in the opposite direction, as may best be seen from parts 104a and 104b in FIG. 6; similarly the tabs 105 will therefore be on the opposite (i.e., left in FIG. 6) side of the bracket. Therefore except for their (reversed) spacial orientation the lower tubular spacers 106′, 107′ and 108′ may be identical to the corresponding spacers (106–108) for longitudinally locating the upper brackets already described. Because of this complete symmetry of the upper and lower brackets, there appears to be no need to repeat what would be essentially the same description of the manner in which they are supported, it merely being noted that because the lower brackets 181a–84a and 81b–84b ) are in fact identical in every way except for spacial orientation with the already described upper brackets and the elements associated therewith, that manufacturing cost are reduced since only a single type of bracket need be manufactured for all 16 of the brackets, regardless of which location they are intended to occupy in the device.

Returning again to the specific description of the upper brackets, as may best be seen in FIGS. 3 and 5, each of these brackets is formed at its lower end with an integral reduced fingerlike projection. Although all of the front and rear depending brackets (and indeed all of the brackets, as just described) are identical, for convenience the projection on the front depending brackets 81c–84c are referenced 86c, while those on the rear brackets 81d–84d are referenced 86d. Each of projections 86c (see FIG. 3) extend through a slot-shaped aperture in a single front lower drawbar 90c, while corresponding projections 86d on the rear depending brackets (81d–84d) project through similar slots (see FIG. 5 at 87d) in a single rear lower drawbar 90d. Similarly each of the front depending brackets (81c–84c) is spring biased in a counter-clockwise direction about axles 91c–94c by identical tension springs 88c, attached at its opposite ends to the lower part of the respective brackets and to the drawbar 90c; while the corresponding rear depending brackets (81d–84d) are analogously biased by means of identical springs 88d tensioned between the depending brackets and drawbar 90d.

In an analogous manner the front lower brackets (81a–84a) have at their upper ends a single like projection 86a extending through a similar elongated slot in front upper drawbar 90a (see FIG. 3); while the rear lower brackets (81b–84b) have similar projections at 86b extending through similar slots 87b in rear upper drawbar 90b, as may best be seen in FIG. 5. In a manner analogous to tension springs 88c and 88d already described, tension springs 88a and tension springs 88b are provided between the upper ends of the front (81a–84a) and rear (81b–84b) brackets and their corresponding drawbars 90a and 90b, respectively. However, tension springs 88a and 88b tend to pivot their respective brackets (81a–84a and 81b–84b) in a clockwise direction about lower axle 91a, thus preserving the relative symmetry of their action despite the inverted spacial relation of the lower brackets relative to the upper brackets.

As may best be seen in FIG. 5, whenever a drawbar (90a, 90b, 90c and 90d) is in its normal or rest position, namely, with the drawbar positioned all the way to the left so that its left-hand end (see 95a and 95c in FIG. 3 and 95d in FIG. 5, as well as ends 95b and 95c in FIG. 4) extends a substantial distance to the left of the left-hand end wall part 110′ of the fixed frame 110. In this left-hand normal or rest position of the drawbars (see especially FIG. 5 with reference to drawbar 90d), the part (e.g., 96d) of the drawbar defining the right-hand edge of the slot (e.g., 87d) into which the cooperating extension (e.g., 86d) of a bracket (e.g., 81d) extends will bias the bracket in such manner as to disengage the respective driven wheel or roller (e.g., 51d) from the mating driving wheel e.g., 41b). On the other hand (as may best be seen for example from drawbar 90b in FIG. 5), when the drawbar is in its retracted or operative position by being pulled to the right, the blocking edge 96b of the slots 87b frees the projection 86b, so as to allow movement of projection 86b generally to the right and therefore rotation of the bracket (e.g., 81b) in such a manner as to cause engagement of a driven roller (e.g., 51b) with a drive wheel (e.g., 41b). At the same time movement of a drawbar to the right will cause increase in the existing tension of the connected tension springs (e.g., 88b in FIG. 5) tending to move the end of the bracket (e.g., 81b, 82b, 83b and 84b) bearing the projection (86b) toward the right, so as to cause such engagement of the driven wheel or roller (e.g., 51b–54bb–44b), because of the pivotal movement about its axis (e.g., 91a–94a) of the entire bracket (81b–84b, in this case in a clockwise direction).

Similar retraction of a lower drawbar (e.g., 90d in FIG. 5) will of course cause analogous freeing of the restraint (by edge portions 96d) on the end projections (e.g., 86d) of the four depending brackets associated with the particular drawbar and simultaneously create additional tension on the four springs (e.g., 88d) connecting the corresponding four brackets and the drawbar, thereby causing movement (to the right as viewed in FIG. 5) of the lower end of a depending bar (e.g., the end having a projections 86d) so as to cause analogous rotation of each of the brackets (e.g., 81d–84d) about its pivot axis (e.g., 91c–94c), except that in this case the movement will be counterclockwise about the pivot. Except for this difference in orientation in space, the action will otherwise be substantially identical as that described and shown for the "b" group of elements, in that the driven wheels or rollers (e.g., 51d–54d) will all be moved into engagement with its respective driving wheel (41b–44b). Thus actuation of any one of the four drawbars (namely, 90a, 90b, 90c and 90d) will cause a particular group or set of driven rollers and their associated potentiometers to be coupled to one or the other series of drive wheels (namely, either 41a–44a or 41b–44b).

An exemplary manner in which the drawbars may be normally positioned in their rest or leftmost position in FIGS. 3–5 (so as to hold the associated brackets in the position to disengage their respective driven rollers from the drive rollers) is best seen in FIG. 5. Each of the right-hand ends of the drawbars is rigidly attached to the corresponding one of four armatures, for example, by a slot (see FIGS. 3 and 5) in which it may be fastened as by screws 99 (see FIG. 4). As may best be seen in FIG. 5 each of the armatures (e.g., 98b and 98d) and therefore their associated drawbars (90b and 90d, respectively) are biased to the left, as exemplified by a compression spring, e.g., 125b and 125d, bearing against the right-hand end of the armature drawbar assembly, thereby strongly biasing all such assemblies to the left (as viewed in FIGS. 3 and 4 as well as FIG. 5). Both the armatures (98a–98d) and the compression springs (for example 125b and 125d) may be positioned within a central longitudinal channel (e.g., 126b and 126d) formed in each of the solenoid assemblies 130a–130d (see 130b and 130d in FIG. 5). The left-hand ends (95a–95d) of the drawbars (90a–90d) may be guided in appropriately shaped slots in end wall portion 110' of the fixed frame 110, as indicated at 127b and 127d, respectively, for ends 95b and 95d drawbars 90b and 90d in FIG. 5. Each of the solenoids 130a–130d may be attached to a bracket or subframe 135 as by screws 136, bracket 135 being in turn connected, as by screws 138 (see FIG. 3) to the right-hand end wall portion 110'' of the main fixed frame 110.

Because of the mechanism so far described, each of the drawbars (90a–90d) will normally be, as stated before, in its extreme left-hand position because of the force of each of the various large compression springs (see in particular 125b and 125d in FIG. 5). The force of compression of each such spring (e.g., 125d) need not be strong, since it does not, in general, operate against the accumulative force of tension of the small springs (e.g., all four springs 88d) connecting the various brackets (e.g., 81d–84d) to its associated drawbar. This is so since the small tension springs only tend to move the drawbar also to the left (relative to the ends of the brackets 81d–84d, etc.) and are in any event only under slight tension force when both the brackets and the drawbar are in their leftmost position (as at 81d–84d and 90d in FIG. 5). In any event the compression springs (e.g., 125d) will cause the various parts to assume the position shown by those elements having a suffix of "d" in FIG. 5. However when a particular solenoid (e.g., 130a, 130b, 130c or 130d) is electrically actuated, the armature thereof (see 98b in FIG. 5) and its associated drawbar (e.g., 90b) will be pulled to the right against its compression spring (e.g., 125b) so as to disengage the blocking portion 96b from the projections 86b on the one set of brackets (81b–84b) so as to cause engagement because of (increased tension of) springs 88b of one set of driven rollers (51b–54b) with a set of drive wheels (41b–44b).

Obviously when any one of the four solenoids (130a–130d) is thus energized, rotation of any one of the manual knobs 11, 12, 13 or 14 will then cause movement through the corresponding drive wheel (e.g., either 41a–44a or 41b–44b) of the particular one of the four driven wheels that may be so engaged. The operator may then by manually turning any one or more of these knobs adjust one or more of the dual potentiometers in a particular group (e.g., the "b" group for the position shown in FIG. 5). Thus assuming that solenoid 130b is energized so as to move armature 98b and therefore drawbar 90b against spring 125b to the right as shown in FIG. 5, manual movement of knob 11 (see FIGS. 1 and 4) will cause transmission of this rotative motion to shaft 31, the rear drive wheel 41b, the now engaged driven roller 51b to shaft 61b, so as to cause rotative adjustment of the dual potentiometers 71b. In this manner the operator may adjust these potentiometers so as to set a particular value on potentiometers 71d as determined by reading meter 21, which will be connected to one of dual potentiometers, while the other one is thus set to a particular value in the first function control circuit (e.g., amplifier gain) of the entire control system. In a similar manner, manual rotation of any one of the other knobs 12, 13 or 14 will, (when solenoid 130b is being energized) set each of the second, third, and fourth function-controlling dual potentiometers of the "b" group, namely, 72b, 73b and 74b respectively, to any particular value the operator may desire. In this manner the operator may set the "b" group of dual potentiometers to whatever individual values he desires so as to form a "b" grouping or "mode" for the four different functions controlled respectively by the potentiometers 71b, 72b, 73b and 74b.

It should be noted that when any one of the drawbars 90a–90 is moved from its rest position (to the left in, for example FIG. 5) to its active or engaged position (to the right, as for bar 90b in FIG. 5), the particular set of brackets (81b–84b in this example) are "free floating" in that their projections 86b are in slot 87b and not directly touched by any part of the drawbar 90b. For this reason the brackets and their associated driven rollers (e.g., 51b–54b) are pivoted about their pivot axis (e.g., 91a–94a) solely under spring tension, provided at 88b, until the individual driven rollers 51b, 52b, 53b and 54b engage the drive wheels (41b–44b, respectively). In this manner the driven rollers and their respective drive wheels are constantly biased by spring tension into contact with each other, thereby substantially reducing the precision not only of the drive wheels and driven rollers, but also the preciseness and "fit" of all of the parts involved (e.g., the tightness of each bracket on its pivot axis, the precision of the mounting of the potentiometer shafts, and the like). Thus this type of spring urging (analogous to that often utilized for cam rollers relative to cams) of the driven rollers relative to the drive wheels greatly reduces the precision of both manufacture and assembly of the various parts. It may be noted in passing that the driven rollers (e.g., 51b etc.) and the drive wheels (41b etc.) preferably are made of, or at least comprise at their circumferential periphery, a material having relatively high friction (e.g., hard rubber, certain well-known artificial resins, or other well-known high-friction compositions). The combination of utilization of spring urging and relatively high friction materials in the engaged parts greatly reduces the cost of manufacturing and assembly by substantially reducing the requirements for precision in both making and assembling the parts.

Once the operator has set the various potentiometers (e.g., 71b, 72b, 73b and 74b) to a particular group of values desired for the first, second, third and fourth functions, deenergizing of the particular solenoid (e.g., 130b) will of course cause its associated drawbar (90b) to be returned to its rest or normal position (to the left in FIG. 5). This will of course cause engagement of the edge portions, as at 96b, of the drawbar with an edge of the bracket projections (86b) so as to move all of the associated brackets (81b–84b) to such position as to disengage the driven rollers (51b–54b) from the drive wheels (41b–44bbq). Once the solenoid has been deenergized and the parts so returned, manual movement of the various knobs 11–14 will not effect the adjusted positions of the individual potentiometers (71b–74b). Thus the four values for the four different functions set into the "b" grouping will remain intact, so as to be capable of being utilized over and over again. Of course the operator may adjust any one or more of these potentiometers by causing the solenoid 130b to be reenergized.

In general the operator will set all of the different potentiometers in a particular group (for example, 71a, 72a, 73a and 74a) for each of the groupings or modes "a," a." "b," "c," and "d," by energizing singly each of the four solenoids and setting each of the four potentiometers that are thus connected to the various drive shafts in turn, deenergizing that solenoid (say 130a), energizing the next solenoid (say, 130b) and manually adjusting each of the "b" group of potentiometers, and so on. Once the operator has thus set up or programmed each of the four distinct groups of potentiometers, he may "recall" for use any one of the groups, or if the settings in none of the groups are appropriate for the particular operation (say analysis when a spectrometer is controlled by the control system of the invention), the operator may cause energizing of any one of the four solenoids so as to set different values into the four separate function controlling elements of any particular group of potentiometers (e.g., 71a–74a, 71b–74b, etc.).

SETTING AND USE OF FUNCTION-CONTROLLING ELEMENTS

One convenient manner in which the individual (four in the exemplary embodiment) elements (e.g., controlling a different function) of each of the (also four in the exemplary embodiment) different groupings (modes or programs) may be "-set," and then any grouping (e.g., the "a" group, "b" group, the "c" group or the "d" d"group) may be recalled for use will now be explained with reference to FIG. 1, FIG. 2 and especially FIG. 7. In FIGS. 1 and 2 a manually operable mode selector switch at 140 has four angularly rotative positions, so as to choose any one of the four modes, programs or groupings of potentiometers, designated as the A, B, C and D modes or groupings as indicated in FIG. 1. This manually operated switch 140 actually comprises a series of (five in the exemplary embodiment) "stacked" switches, the first three of which are indicated as mechanically ganged switches 140', 141 and 142 in FIG. 7. For a system controlling four functions, i.e., using four different series of function-controlling elements (that is potentiometers 71a–71d for the first function, 72a–72d for the second function, 73a–73d for the third function, and 74a–74d for the fourth function), there will be provided a total of four ganged switches of the type shown at 141, 142 in FIG. 7, in addition to the basic mode selector switch 140' therein. In fact each of the additional switches 141, 142 etc. will actually comprise a ganged pair of switches, only one of which is shown in FIG. 7. In particular switch 141 will selectively connect the instrument-controlling potentiometer of each one of the potentiometer pairs 71a, 71b, 71 c or 71d over that particular lead 141a–141d and that contact 151a–151d that is actually engaged by switch arm 151 to the controlled element or circuit of the instrument over output lead 161 (e.g., leading to the typically feedback-type amplifier gain control circuit in a spectrometer). In a similar manner the position of switch arm 152 of the second function-controlling switch 142 will determine which of the potentiometers 72a–72d is connected (by respective leads 142a–142d and contacts 152a–152d) to control the second function of the instrument (for example, the scan time or speed in a spectrometer). Because of the ganging of all of the switches (as schematically illustrated in 145, 146, 147, etc. but actually accomplished merely by using stacked switches all on a single shaft in the exemplary embodiment) all of the switch arms (including 150 of switch 140' as well as switch arms 151, 152 and of the other switches not shown in FIG. 7) will always connect the corresponding function-controlling elements (that is those in the same group such as potentiometers 71b, 72b, 73b etc.) to the different function outputs (at 161, 162 etc.) at the same time. As previously noted, each of the switches 141, 142 etc. is preferably itself a dual switch, so as to simultaneously connect the other potentiometer of each pair (see 75, 76 at 71d in FIG. 4) to the respective meters (21–21 in FIG. 1) so as to give a visual indication to the operator of the setting of each of the other one of the dual potentiometers actually utilized to control the instrument functions.

Although the exemplary embodiment utilized a four-by-four matrix of dual potentiometers and functions (that is a utilization of four groups of dual potentiometers, namely, the a, b, c or d group, for controlling simultaneously four different functions (i.e., the one, two, three or four function), it is obvious that either the number of groups of control elements (e.g., potentiometers) or the number of functions controlled may be less or greater than four. To indicate this in the drawing, FIG. 4 shows part of an additional group of potentiometers at the upper right-hand corner in dotted lines, the dual potentiometers of which is generally indicated at 74e; this illustrates how a fifth (and if desired by repeating the structure underneath, a sixth) group of control elements may be added, not only to the fourth function but to the other functions as well in an analogous manner. Obviously all of the other elements required to operate this fifth (and sixth if desired) group of control elements would also have to be supplied, as partially indicated by dotted drawbar 90e and solenoid 130e. In a similar manner the number of functions controlled may be increased or decreased as generally indicated by the pair of broken lines 170 near the left of FIG. 4, indicating that more of the (four) generally vertically extending function assemblies may be added if more than four functions are desired to be controlled. Obviously by removing any of the generally vertically extending functional assemblies e.g., the assembly comprising elements 11, 31, 41a, 41b, 51a–51d, 71a–71d, 91a, 91c and 101a–101d, for example) the number of functions may be reduced. This is merely mentioned at this point so as to indicate that although FIG. 7 only shows two (of the assumed to be four in the exemplary embodiment) functions and shows all four of the groups of control elements that may be used with each function more or less groups and more or less functions than four may actually be used in any embodiment.

As may be seen at the left in FIG. 7, the ganged switch 140 includes at 140' a switch having switch arm 150 for selectively energizing any one of the solenoids 130a–130d over a particular one of the leads 140a–140d through contacts 150a–150d. However the solenoid chosen by the position of switch arm 150 will only be energized if simultaneously the parameter set switch 160 is also closed by pushbutton 165 so as to cause switch-closing element 166 to bridge contacts 167 and 168, thereby connecting a source of DC electrical energy 170 to switch arm 150 through leads 175 and 176. Thus although the switch arm 150 is closed onto a particular contact (e.g., 150b in FIG. 7), the solenoids (and in particular solenoid 130b) will not be actuated so as to move its armature and therefore the associated drawbars (90b in this case) unless pushbutton 165 of the parameter "set" switch 160 is also being pushed (so as to close a circuit through contacts 167 and 168 as by the schematically shown bridging bar 166). When the selecting arm 150 of switch 140' is on a particular contact (e.g., 150b as shown in FIG. 7) and the parameter set switch 160 is closed, then of course energizing of the solenoid (130b) and movement of the corresponding drawbar (90b) will cause each of the "b" control elements (that is 71b, 72b, 73b and 74b in the exemplary embodiment) to be connected to a respective one of the manually operated setting means. This is merely schematically illustrated in FIG. 7 by diagrammatically indicating the approximate position of the elements associated with the individual control elements (e.g., potentiometer 71b) as at 51'b, 81'b corresponding to the similarly numbered (unprimed) elements among others in the structural embodiment already described (see for example FIG. 5). Similarly, elements 52'b and 82'b correspond to the analogous elements 52'b and 82'b correspond to the analogous elements for potentiometer 72b; while elements 86'b exemplify not only the projections 86b on each of the brackets (81b–84b) which are released by movement of the drawbar (90b) but also the spring urging (by springs 88b) of the brackets on movement of the drawbar. The manually operable means, not directly affected by the drawbar (90b) movement, is schematically illustrated as 11', 31', and 41'a, 41'b, 41'c and 41'd for the first function manually operating setting means; and 12', 32', and 42'a, 42'b, 42'c AND 42'd for the second function manually operated setting means, again corresponding generally to the more specifically shown unprimed elements, for example, 11, 31, and 42a and 41b for the first manually controllable setting means (for the first function), since 41'c and 41'd in FIG. 7 are actually only different edges of the drive wheels 41a and 41b respectively.

As may now be readily seen, whenever the main mode switch 140 is positioned to the "B" position, all of the "b" potentiometers (71b, 72b, etc.) will be connected to the instrument being controlled through switch arms 151, 152, etc. of ganged switches 141, 142, etc. If the "b" group of potentiometers have already been preset to appropriate values, each will cause the function of the control instrument to which it is connected to be set or programmed in the manner desired for this particular type of operation (e.g., a particular type of operation (e.g., a particular amplifier gain, scan speed, slit width setting, and scan sped suppression in a spectrophotometer). However if the operator wishes to reset (or of course when forming a new operation, such as a new type of analysis, to set potentiometers initially), the operator will close the parameter set switch 160 so as to cause all of the, say, "b" potentiometers to be connected to their respective manually operated setting means schematically shown at 11', 31', 41'b; 12', 32', 42'b; and so on in FIG. 7. The operator may then adjust any or all of the "b" potentiometers in value so as to set each of them to the desired value to control their particular function for a particular operation of the instrument.

OPERATION AND SUMMARY

The invention control system is particularly useful when the instrument being controlled is often used with a moderately small number of different combinations of desired settings (the specific embodiment allowing four such combinations of settings on each of the functions controlled). In such usage, the operator, upon first encountering the instrument, would set each one of the "a" potentiometers by moving the parameter mode selector switch 140 to "A" (and therefore setting all of switches 140', 141, 142 etc. to the corresponding "a" contacts), pushing the parameter set switch 160 and individually adjusting each of the "a" function-controlling elements or parameters by knobs 11, 12, 13 and 14 respectively in FIGS. 1, 3 and 4 and the corresponding analogous (primed) "a" elements in the schematically illustrated FIG. 7. Having thus set a particular "a" mode or program for immediate or future use, the operator may then repeat the entire procedure after moving the main selector switch 140 and depressing the "set" switch 160 for each of the other groups (namely, b, c and d in the illustrated embodiment) in an analogous manner. The exemplary embodiment of the invention therefore allows the operator to subsequently utilize the already preset "a" values (that is the values already set on potentiometer 71a, 72a, 73a and 74a for the four different functions) by merely moving the selector switch 140 back to the "a" position, thereby connecting the "a" function-controlling elements (potentiometers) to the four different controlled functions (1–4) of the instrument.

In the exemplary usage the operator would normally set each of the "a," "b," "c" and "d" groups of potentiometers to a set of values that corresponded to commonly utilized combinations for often reoccuring analyses. This allows the operator to operate the instrument with any one of four combinations or groups of the four function-controlling potentiometers.

It is again pointed out that more (or less) than four different groups of potentiometers (i.e., a, b, c, d, e etc.) may be utilized, nor is the system of the invention limited to controlling four instrument functions (e.g., the various elements ending in "1," "2," etc., could be repeated any practical number of times so as to provide a series of control elements for, say, three, five, six or any reasonable number of different instrument functions). Although all the control elements in a particular series (e.g., 71a, 72a, 73a and 74a) for controlling a particular function will typically be identical to each other, it is of course neither necessary nor even likely that the control elements for different functions (e.g., 71b, 71c, etc.) be identical or even of the same type. Thus, although elements 71a–74a are typically identical (dual) potentiometers, elements 71b–74b may be different (although typically identical to each other) dual potentiometers (or even in some usages different types of elements, such as variable transformers or other control elements). Thus, the inventive control system is not limited to any of the particular details of the exemplary embodiment except as recited in the appended claims.

What is claimed is:

1. A control system for conveniently controlling a plurality of functions of an instrument, comprising:

a first series of first instrument function-controlling elements, each being variable over a first range of values;

at least a second series of second instrument function-controlling elements, each being variable over a second range of values;

a first element-setting means, removably engaged by any one of said first function-controlling elements;

at least a second element setting means, removably engaged by any one of said second function-controlling elements;

a plurality of conjoint connecting means each operatively associated with a particular one of said first function-controlling elements and a corresponding particular one of second function-controlling elements, in such relationship as to cause a particular one of said first function-controlling elements to operatively engage said first element-setting means and simultaneously cause a corresponding particular one of said second function-controlling elements to operatively engage said second function-setting means;

switching means for selecting which of said connecting means is to be actuated;

and actuating means for causing actuation of that selected one of said connecting means, to cause simultaneous engagement of particular selected corresponding ones of said first and said second function-controlling elements with said first and said second element-setting means, respectively;

whereby movement of each of said element-setting means will adjustably move said particular selected corresponding ones of said function-controlling elements, thereby allowing individual adjustment thereof.

2. An instrument control system according to claim 1, in which:

said switching means comprises additional ganged switch means for simultaneously operatively connecting each of said selected ones of said function-controlling elements to a respective function-controlling input of the instrument being controlled.

3. An instrument control system according to claim 1, in which:
   biasing means are operatively attached between each of said connecting means and the particular ones of said first and said second function-controlling elements associated therewith;
   said connecting means further comprises a blocking portion for maintaining said associated first and second function-controlling elements out of operative engagement with its respective element-setting means prior to actuation of said connecting means;
   said biasing means being so positioned as to cause said function-controlling elements to be engaged with its respective element-setting means when said connecting means is actuated to move said blocking portion out of the way of said function-controlling elements;
   whereby said first and said second function-controlling means are in resiliently biased engagement with said first and said second element-setting means upon actuation of its respective connecting means.

4. An instrument control system according to claim 3, in which:
   said biasing means comprises an individual resilient means, operatively connected between each of said first and said second function-controlling elements and their particular associated conjoint connecting means;
   said resilient means being of such construction and relative position that actuation of said conjoint connecting means increases the force of said resilient means tending to bias said first and said second function-controlling means into engagement with said first and said second element-setting means, respectively, upon actuation of their respective conjoint connecting means.

5. An instrument control system according to claim 1, in which:
   said actuating means comprises an on-off electrical switch, one terminal of which is supplied by a source of electrical energy;
   each of said conjoint connecting means comprises an individual electromotive means;
   and said switching means comprises an electrical selecting switch for selectively connecting a particular one of said electromotive means to the other terminal of said on-off electrical switch;
   whereby closing of said on-off switch will actuate the particular electromotive means selected by the position of said electrical switch means, thereby causing actuation of a particular selected one of said connecting means so as to cause simultaneous engagement of a particular one of said first and said second function-controlling elements with said first and said second element-setting means, respectively.

6. An instrument control system according to claim 5, in which:
   said switching means further comprises additional ganged switch means for simultaneously operatively connecting each of said function-controlling elements to a respective function-controlling input of the instrument being controlled;
   whereby movement of said switching means and its additional ganged switch means always selects a particular one of said first and said second instrument function-controlling elements for operatively controlling said instrument regardless of the position of said on-off electrical switch.

7. An instrument control system according to claim 1, in which:
   at least a third series of instrument function-controlling elements each variable over a third range of values are provided;
   at least a third element-setting means, capable of being operably engaged by any one of said third function-controlling elements, are provided;
   each of said plurality of conjoint connecting means being also operatively associated with a particular one of said third function-controlling elements, in such relationship as to be capable of causing a particular one of said third function-controlling elements to operatively engage said third element-setting means simultaneously with the operative engagement of the corresponding particular one of said first and said second function-controlling elements with said first and said second element-setting means, respectively;
   said switching and actuating means thereby causing simultaneous engagement of a particular selected corresponding one of said first said second and said third function-controlling elements with said first, said second and said third element-setting means, respectively upon selected actuation;
   whereby movement of each of said first, second and third element-setting means will adjustably move said particular selected corresponding one of said first, second and third function-controlling elements, thereby allowing individual adjustment thereof.

8. An instrument control system according to claim 1, in which:
   said first and said second series of instrument function-controlling elements comprise at least four function-controlling elements each;
   whereby four different groupings of instrument-controlling values may be obtained.